Dec. 17, 1929.    C. R. OWENS    1,739,559
FILTERING FUNNEL
Filed Feb. 23, 1929
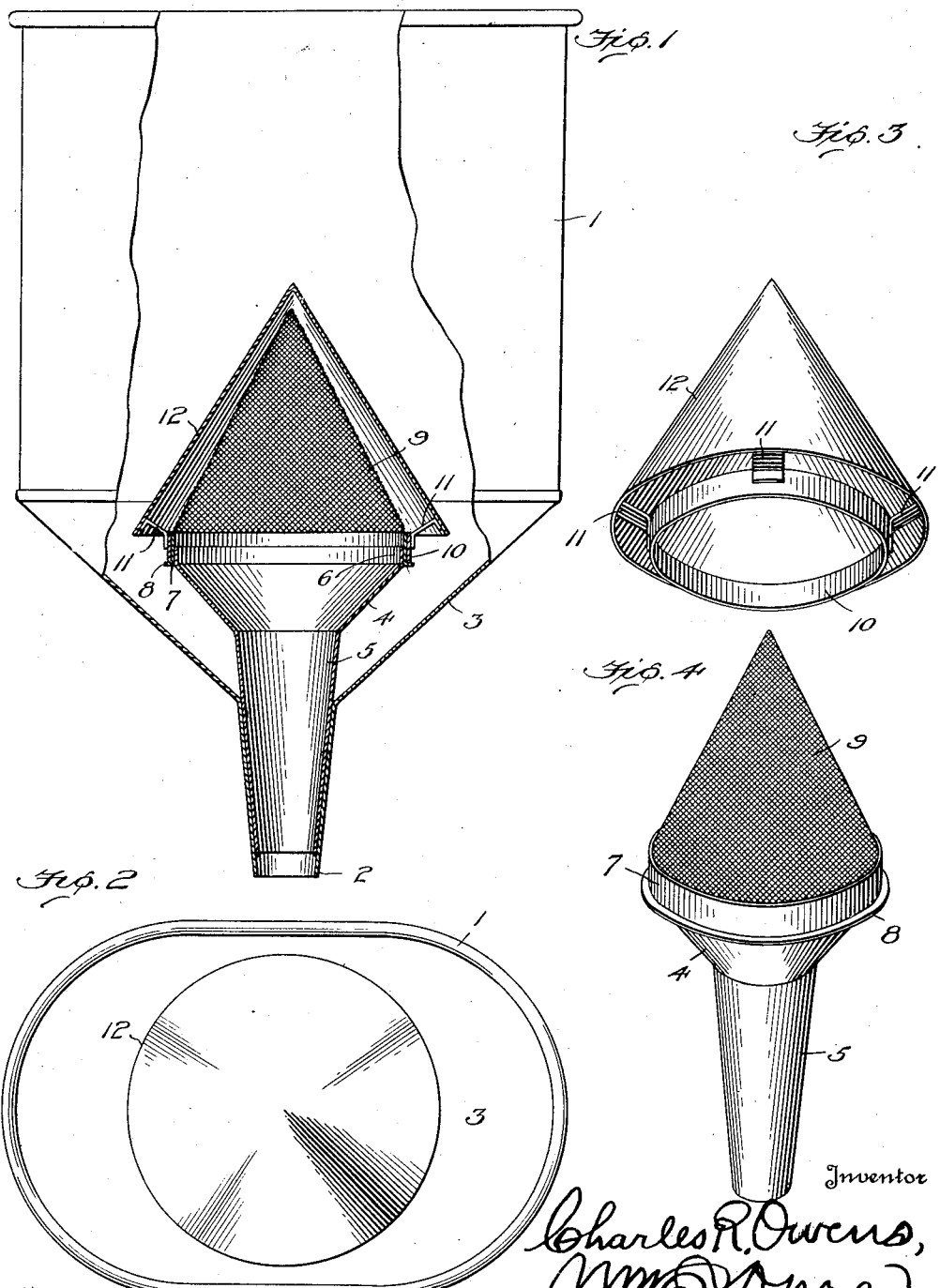

Patented Dec. 17, 1929

1,739,559

UNITED STATES PATENT OFFICE

CHARLES R. OWENS, OF WASHINGTON, DISTRICT OF COLUMBIA

FILTERING FUNNEL

Application filed February 23, 1929. Serial No. 342,228.

My present invention relates to funnels provided with means for effecting separation of a liquid from other liquids of different specific gravities and from solids, and more particularly the separation of immiscible and heavier liquids, such as water, and insoluble and relatively heavy solids, such as sand, dirt, iron rust and other impurities, from hydrocarbon distillates of specific gravities less than 1, such as gasoline.

One object of my invention is to provide a separating means for the purpose indicated which may be incorporated in an ordinary funnel, whereby the impurities may be removed from the contaminated liquid in the operation of transferring that liquid from one container to another. Thus, the water and sediment may be separated from gasoline by substituting for the customary funnel now in use the novel funnel which I shall describe and claim herein, in making transfer of the gasoline from a tank wagon to the usual underground filling station tank, in this manner purifying the gasoline without the expenditure of any more time or effort than would be necessary if an ordinary, non-separating funnel were used.

A further object is to provide such separating means as may be readily and detachably incorporated in plain funnels of well known construction and universal use, which, in addition to accomplishing an efficient separation of the impurities as indicated above, will be at once economical of manufacture and durable of construction.

A still further object is to provide an impurity-removing funnel with the novel parts so positioned and shaped that splashing of liquid out of the funnel may be entirely prevented, regardless of the angle at which the incoming stream meets the funnel parts.

With the foregoing and other objects in view which will sufficiently appear to those familiar with the art, my invention consists, in one form of embodiment, in the novel combination and arrangement of parts illustrated in the drawings, described in this specification, and pointed out in the appended claim.

In the drawings accompanying this application for Letters Patent, in which like reference characters indicate the same parts in the several views, Figure 1 is a side elevation of a funnel constructed according to my invention, with the body thereof partly broken away, and with the novel parts shown in vertical section;

Fig. 2 is a top plan view of the same;

Fig. 3 is a perspective view of the hood or shield for the filtering screen; and Fig. 4 is a perspective view of the filtering element.

Referring to the drawings, 1 indicates the body or receiver portion of a funnel of well known construction and form, provided with a discharge spout 2, which is connected with the body by the flared portion 3. The novel filter element of my invention, shown in Fig. 4, consists of a flared connecting portion 4, substantially like, but smaller than, the corresponding part 3 of the funnel, and terminating in a spout 5 which is preferably an exact counterpart of the spout 2 of the funnel. When so constructed, the spout 5 may be inserted in the spout 2 to make therewith a liquid-tight connection, and when so associated the tops of the two spouts are spaced apart a short distance, and the two inverted cones 4 and 3 are likewise spaced apart, as shown in Fig. 1, to provide a pocket in the lower part of cone 3 for a purpose hereinafter explained.

The upper part of the cone 4 terminates in a cylindrical portion 6, around which is sleeved and secured by solder or equivalent means a circular band 7 whose lower edge is turned out at right angles to form a narrow annular flange 8. The band 7 serves as a rigid base and support for a conical wire screen 9 which constitutes the filter or strainer element of my invention.

When the material to be purified by a device constructed according to the principles of my present invention is gasoline, this strainer 9 is for best results constructed of wire screen of about 200 meshes to the inch. I have found that such 200 mesh wire screen is sufficiently permeable to allow relatively ready passage of gasoline therethrough, and at the same time sufficiently fine to catch the solid impurities and prevent the passage of water because of its higher surface tension.

Detachably sleeved over the band 7 and resting on the flange 8 thereof is the band 10, to which is connected, by means of a series of spaced brackets 11, a screen protecting shield or hood 12. The latter is conical and substantially similar in shape to the strainer 9, but somewhat larger in its dimensions so that a relatively large clearance separates the inner surface of the hood and the outer surface of the strainer.

From the foregoing description and the illustrations in the accompanying drawing, it will be apparent that the parts shown in Figs. 3 and 4, i. e., the hood and filter elements respectively, are mutually detachable and when assembled are adapted to detachably fit into the spout 2 of an ordinary funnel of proper size, as shown in Fig. 1, thus converting such a funnel into a filtering funnel.

In operation, the gasoline with its contained impurities is poured into the body of the funnel. It will be apparent that the pocket formed by the sides of the two cones 3 and 4 will soon become filled and the liquid will rise above the band 10 to seek its only outlet, which is penetration of the screen 9, and fall through the spout 5. Because of their higher specific gravity, however, the water and solid impurities will settle in the pocket between the cones 3 and 4 and be trapped therein, while clean gasoline will rise, as more liquid is poured into the funnel, and pass through the strainer 9, the spouts 5 and 2, and so into the receptacle to be filled.

When liquid is introduced into the funnel body in some volume and with considerable force, convection currents are set up in the sediment pocket which tend to some extent to carry a portion of the previously settled out impurities up above the level of the band 10. These current-carried impurities, however, are prevented from passing over the band 10 and so out of the funnel with the clean gasoline by the screen 9, which, as has been said, is preferably constructed of about 200 mesh wire. I have found that such a screen is sufficiently fine to prevent passage of harmful solid impurities because of the size of the particles, and will also hold back any water globules by reason of the high surface tension of water as compared with gasoline. When the sustaining force of the current which has carried the water and solids up to the screen fails, the steep sides of the conical screen will no longer support these impurities so that they settle again into the sediment pocket and eventually all collect in the lower part of the pocket whence they may be removed by simply inverting the funnel.

The clearance between the lower edge of the hood 12 and the bottom of the filter 9 is made sufficiently large to allow fall of the heavy impurities simultaneously with rise of the lighter gasoline.

One important function of the hood 12 is to protect the wire screen 9 from being injured by the nozzle of a delivery hose, the spouts of cans, or other rigid bodies which may be inserted into the funnel body and which, in the absence of the hood 12, might contact with the screen 9 to its damage. Another important purpose of this hood is to prevent the incoming stream of impure gasoline from directly striking the screen and thus forcing impurities therethrough. In other words, the use of the hood limits the force available to pass the gasoline through the screen to the static head of the liquid above the band 10, the kinetic energy of the incoming stream's flow being dissipated as friction against the funnel parts and against the liquid contained in the sediment pocket.

The hood is made conical in shape for two reasons. I have found that the conical shape best withstands the impact of nozzles and spouts, tending to deflect these bodies instead of absorbing the full force of the blow. I have also found that with the hood made in conical form liquid may be introduced into the funnel at any angle or velocity without suffering any loss by splashing. The reason for this is clear, since when the stream impinges against the hood it will be deflected so that the angle of reflection equals the angle of incidence, and in no case is it possible to obtain a line of reflection which will terminate outside the funnel body, so long as the line of incidence has its origin anywhere above the upper edge of the funnel.

It is to be understood that I have illustrated and described but one form of my present invention. Modifications will readily suggest themselves to persons skilled in the art to which this invention relates, but all such modifications are to be considered within the principle of my invention and within the scope and purview of the appended claim.

Having thus described my invention, what I claim and desire to secure by Letters Patent is:

A filtering element for funnels of the type including a body, a spout, and an upwardly flared section connecting the body and spout, said filtering element including a spout section to fit frictionally within the spout of the funnel, an upwardly flaring portion extending from the upper end of the spout section, said flaring portion extending in spaced parallel relation to the flared section of the funnel to thereby provide a relatively deep downwardly and inwardly inclining sediment trap open only at the upper end, a conical screen carried by the flaring portion of the filtering element, and a hood of conical form supported to overlie and cover the screen other than at the lower end of the hood, plane of the exterior of the hood being substantially at right angles to the flaring section of the funnel whereby the incoming liquid is directly intercepted by the flaring section of the funnel and directed therefrom to and beneath the hood and through the screen without disturbing the material in the comparatively deep sediment trap.

In testimony whereof I affix my signature.

CHARLES R. OWENS.